US011093387B1

(12) United States Patent
Chinthekindi et al.

(10) Patent No.: US 11,093,387 B1
(45) Date of Patent: Aug. 17, 2021

(54) GARBAGE COLLECTION BASED ON TRANSMISSION OBJECT MODELS

(71) Applicant: EMC IP Holding Company LLC, Hopkinton, MA (US)

(72) Inventors: Ramprasad Chinthekindi, San Jose, CA (US); Abhinav Duggal, Milpitas, CA (US); Kalidas Balakrishnan, San Jose, CA (US); Fani Jenkins, Broomfield, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 530 days.

(21) Appl. No.: 16/172,298

(22) Filed: Oct. 26, 2018

(51) Int. Cl.
*G06F 12/02* (2006.01)
*G06F 3/06* (2006.01)
*G06F 16/907* (2019.01)
*G06F 16/901* (2019.01)

(52) U.S. Cl.
CPC .......... *G06F 12/0261* (2013.01); *G06F 3/067* (2013.01); *G06F 3/0608* (2013.01); *G06F 3/0646* (2013.01); *G06F 16/907* (2019.01); *G06F 16/9014* (2019.01)

(58) Field of Classification Search
CPC ............... G06F 12/0261; G06F 16/907; G06F 16/9014; G06F 3/0608; G06F 3/0646; G06F 3/067
See application file for complete search history.

(56) References Cited

U.S. PATENT DOCUMENTS

| 6,105,040 A * | 8/2000 | Agesen | G06F 12/0253 |
| 2014/0040327 A1* | 2/2014 | Onodera | G06F 12/0261 |
| | | | 707/814 |
| 2017/0017588 A1* | 1/2017 | Frid | G06F 3/0658 |
| 2017/0031814 A1* | 2/2017 | Frazier | G06F 3/0653 |
| 2020/0034288 A1* | 1/2020 | Kennke | G06F 12/0269 |

* cited by examiner

*Primary Examiner* — Apu M Mofiz
*Assistant Examiner* — Husam Turki Samara
(74) *Attorney, Agent, or Firm* — Dergosits & Noah LLP; Todd A. Noah

(57) ABSTRACT

System generates data structure based on unique identifiers of objects in object storages and sets indicators in positions that correspond to hashes of unique identifiers of active objects. If a first number of regions of active data objects in first data storage and second number of regions of active data objects in second data storage each fail to satisfy data threshold, then system creates model identifying locations and sizes of regions of active data objects in first data storage and regions of active data objects in second data storage. System resets indicators in positions in data structure which correspond to hashes of unique identifiers of active data objects associated with model and enables remote storage to use model to copy regions of active data objects in first data storage and second data storage to third data storage, and to delete first data storage and second data storage.

23 Claims, 9 Drawing Sheets

GARBAGE COLLECTION BASED ON TRANSMISSION OBJECT MODELS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

An object that is stored in a computer system may be represented by a data structure, such as the tree structure 100 depicted by FIG. 1. A computer system can divide an object into smaller objects, such as dividing a file into files segments. Examples of file segments include a super segment 102 or a level 6 (L6) segment, which may be at the root of the tree structure 100, metadata segments 104, or level 5 (L5) segments to level 1 (L1) segments, which may be intermediate nodes in the tree structure 100, and data segments 106, or level 0 (L0) segments, which are the leaf nodes of the tree structure 100. The level 6 (L6) segments to level 1 (L1) segments may be referred to as level P (Lp) segments. Although this example describes the tree structure 100 as having 7 (L0-L6) levels, the tree structure 100 may have any number of levels.

Each object may be referenced by its fingerprint, which is a relatively short bit string that uniquely identifies an object. For example, FIG. 2A depicts the file segments 200 that can be referenced by the fingerprints 202, such as the fingerprint G 204 that uniquely identifies the file segment G 206.

A garbage collector generally refers to an organizer of storage for retrievable data in a computer system, which automatically identifies a computer system's objects, identifies which objects are live objects, which are the objects that are in use by at least one of the computer system's programs, and reclaims storage occupied by dead objects, which are the objects that are no longer in use by any of the computer system's programs. A garbage collector can begin by executing what may be referred to as a merge phase, which includes storing an index of unique identifiers of a computer system's objects, such as by storing an index of fingerprints for file segments to a disk. The fingerprint index can map each fingerprint to the object storage, which may be referred to as a container, that stores the file segment which is uniquely identified by the fingerprint, such as the fingerprint index that includes the fingerprint G 204 also includes a mapping to the container that stores the file segment G 206.

The garbage collector can continue by executing what may be referred to as an analysis phase, which includes applying a hash function to each fingerprint in the fingerprint index to generate a one-dimensional array that may be referred to as a hash vector, such that the positions in the hash vector correspond to the fingerprints that uniquely identify their file segments. For example, FIG. 2B depicts that the garbage collector applies the hash function 208 to the fingerprints 210 to generate the hash vector 212. Consequently, the bit 214 in the hash vector 212 corresponds to the hash, which is the value returned by a hash function, of the fingerprint G 216, which is the fingerprint G 204 that uniquely identifies the file segment G 206 in FIG. 2 A. Although the example describes a computer system as having 7 file segments, fingerprints, and corresponding bits in the hash vector, a computer system may have any number of file segments, fingerprints, and corresponding bits in the hash vector.

The garbage collector can continue by executing what may be referred to as an enumeration phase, which includes identifying the active objects, and then indicating these identifications in the bits of the hash vector that correspond to the objects' unique identifiers. For example, the garbage collector conducts a level-by-level review of the metadata segments 104 to identify their L0 and Lp references, which include the fingerprints of the live L0 data segments 106 and the live Lp metadata segments 104, each of which are in use by at least one of the computer system's programs. Then the garbage collector can continue the enumeration phase by applying the hash function 208 to these identified fingerprints to create hashes, and then setting the bits in the hash vector that correspond to these hashes, such as setting some of the bits 302 to 1 in the hash vector 304 depicted by FIG. 3.

The garbage collector can continue by executing what is referred to as a selection phase, which includes estimating how much of the data storage in each container is for live objects. For example, the garbage collector identifies the fingerprints for the L0 data segments in the container 140, applies the hash function 208 to these identified fingerprints to create hashes, and then checks the bits in the hash vector 304 that correspond to these hashes. If the bit for a fingerprint's hash is set to 1 in the hash vector 304, then the bit corresponds to a fingerprint of a live object. If the bit for a fingerprint's hash is not set to 1, or is reset to 0, in the hash vector 304, then the bit corresponds to a fingerprint of a dead object.

As part of the selection phase, the garbage collector can continue by selecting a container for garbage collection, which may be referred to as cleaning, based on the number of the objects in the container that are live objects. For example, if the garbage collector has determined that only 10% of the file segments in the container 140 are dead file segments, which are not in use by any of the computer system's programs, then the garbage collector bypasses selection of the container 140 for garbage collection or cleaning, and therefore retains the container 140 as it is. Continuing this example, the garbage collector resets the bits in the hash vector 304 that correspond to the hashes of the fingerprints for the file segments in the container 140, which enables the subsequent processing of containers to not require retention of these file segments, which may be referenced as duplicates in other containers.

In an alternative example, if the garbage collector has determined that 40% of the file segments in the container 140 are dead file segments, then the garbage collector selects the container 140 for garbage collection or cleaning. The garbage collector may evaluate multiple containers in the cleaning range 306 to select any combination of these containers in the cleaning range 306 for garbage collection or cleaning. Although the example describes 40% of a container's dead file segments as exceeding a cleaning criteria or container selection threshold, any cleaning criteria or container selection threshold may be used.

The garbage collector might complete by executing what may be referred to as a copy phase, which includes copying live objects from a selected container that will be reclaimed into another container that will be retained. Continuing the alternative example, the garbage collector creates the new container 250, copies the live file segments in the container 140 into the new container 250, and resets the bits in the hash vector 304 that correspond to the hashes for the fingerprints of the file segments in the new container 250, which enables the subsequent processing of containers to not require retention of these file segments. Possibly completing the copy phase for the alternative example, the garbage collector deletes the container 140, which is a cleaning or a garbage collection that reclaims unused storage space for subsequent reuse. Although examples use numbers such as 140 and 250 to reference containers, any other type of sequential referencing of containers may be used.

If the garbage collector executes the merge, analysis, enumeration, selection, and copy phases while no additional objects are being written to a computer system's containers, then the garbage collector can complete the execution of its phases as described above. However, garbage collection may require significantly more time to complete than the duration of time that a computer system can temporarily suspend the writing of objects to containers. Therefore, the garbage collector can accommodate the writing of objects to containers, which may be referred to as an ingest, while the garbage collector is concurrently executing its phases. Furthermore, the garbage collector can accommodate the writing of deduplicated objects to containers while the garbage collector is concurrently executing its phases. Data deduplication generally refers to a specialized data compression technique for eliminating redundant copies of repeating data.

The garbage collector can identify the writing of objects to containers which occur after the garbage collector started the merge phase until the garbage collector started the enumeration phase, which is depicted as the all live range 308 in FIG. 3 because all of the objects written during this time period are live objects since they have just been written. The garbage collector disables the deduplication of all Lp metadata from the start of the merge phase through the start of the enumeration phase so that metadata which is written is written to new containers, such that the garbage collector can review these new containers for references to data segments during the enumeration phase. For example, between the times that the garbage collector started the merge and enumeration phases, a backup/restore application wrote data to the container 140 and the corresponding metadata to the new container 180, and also wrote new data to the new container 190 and the corresponding metadata to the new container 200. After starting the enumeration phase, the garbage collector reviews the new containers 180-210, identifies the L0 references in the metadata segments in the containers 180 and 200, which identify the fingerprints of the live L0 data segments in the containers 140 and 190, applies the hash function 208 to these identified fingerprints to create hashes, and sets the bits in the hash vector that represent these hashes. When subsequently processing the containers in the cleaning range, the garbage collector will reference the bits for the hashes of the fingerprints for the L0 data segments in the container 140 as indicating live file segments. However, since the new container 190 is not in the cleaning range, the garbage collector will not reference the bits for the hashes of the fingerprints for the L0 data segments in the container 190 as indicating live file segments, such that the garbage collector might not reset the bits for the hashes of the fingerprints for the L0 data segments in the container 190.

Writing an object to a container can resume the use of a dead object. For example, a program in the computer system created the file 60 that included the file segment Z, the backup/restore application wrote the file 60 to the container 160, the program deleted the file segment Z, and the backup/restore application wrote metadata that indicates the deletion of the file segment Z to the container 160. Since the garbage collector has yet to delete the file segment Z from the container 160, the file segment Z is a dead file segment, and the fingerprint index still includes the fingerprint Z for the file segment Z, and still maps the fingerprint Z to the container 160. Then a user of the program instructed the backup/restore application to restore the file segment Z from a backup file, and the program is currently using the restored file segment Z.

The backup/restore application may create a notification to write file segments which include the revived file segment Z when the garbage collector is not executing its phases. Since the fingerprint index still includes the fingerprint Z for the file segment Z, and still maps the fingerprint Z to the container 160, the backup/restore application writes the file segment Z and the corresponding metadata to the container 160 as deduplicated data.

Alternatively, the backup/restore application may create a notification to write file segments which include the revived file segment Z between the times that the garbage collector started the merge and enumeration phases. The garbage collector tracks the resumption of use, or revival, of all dead objects by disabling the deduplication of all Lp metadata from the start of the merge phase through the start of the enumeration phase. Therefore, since the fingerprint index still includes the fingerprint Z for the file segment Z, and still maps the fingerprint Z to the container 160, the garbage collector permits the backup/restore application to write the file segment Z to the container 160 as deduplicated data and write the corresponding metadata to the new container 240. When the garbage collector reviews the metadata in the new containers, which includes the new container 240, the metadata identifies the fingerprint Z of the file segment Z written to the container 160, applies the hash function 208 to the fingerprint Z, and then sets the bits in the hash vector 304 that correspond to the hash for the fingerprint Z of the previously dead file segment Z written to the container 160. When subsequently processing the container 160, the garbage collector will reference this bit as indicating a live file segment, thereby retaining the revival of the previously dead file segment Z.

Since the garbage collector has the capability to track the revival of dead objects, the garbage collector may process the writing of a new object as the revival of a dead object. For example, between the times that the garbage collector started the merge and enumeration phases, a backup/restore application creates a notification to write a new file segment D, and during the enumeration phase the garbage collector applies the hash function 208 to the new fingerprint D for the new file segment D, and then sets the bit in the hash vector 304 that corresponds to the hash for the new fingerprint D. Coincidentally, the hash for the new fingerprint D is the same as the hash for the old fingerprint X of the old file segment X that is a dead segment which is stored by the container 130. Consequently, when the garbage collector processes the container 130 in the cleaning range 306, and reviews the bit set in the hash vector 304 that corresponds to the hash for the new fingerprint D and the old fingerprint X, the garbage collector will process the dead file segment X as a live segment. This collision of bits for the hash of the new fingerprint D and the old fingerprint X may result in the garbage collector not selecting the container 130 for cleaning when the container 130 should have been selected for cleaning, or result in the garbage collector creating a new container for the live file segments of the container 130 and copying the dead file segment X to the new container.

After the enumeration phase starts, the garbage collector can identify additional notifications to write objects to containers. If the garbage collector identifies a notification to write to a container that is in the range of containers that the garbage collector has already cleaned, the garbage collector permits this writing of objects to this container. For example, the garbage collector has already cleaned the containers 180-210, is in the process of cleaning the containers 130-170 in the current batch 402, and then identifies a notification from a backup/restore application to write objects to the container 190 as deduplicated data, as depicted by FIG. 4. Since the garbage collector has already cleaned the containers 180-210, the garbage collector permits the backup/restore application to write the objects to the container 190 as deduplicated data. The garbage collector does not need to apply the hash function 208 to the fingerprints for the file segments written to the container 190 or need to set the bits in the hash vector 304 that correspond to the hashes for the fingerprints of the file segments written to the container 190 because the current processing of containers will not reference these file segments that are only written to a container that is already cleaned.

If the garbage collector identifies a notification to write to a container that is in the range of containers that the garbage collector is currently cleaning, the garbage collector may modify at least some of the writing of objects to this container. For example, the garbage collector has already cleaned the containers 180-210, is in the process of cleaning the containers 130-170 in the current batch 402, and then identifies a notification from a backup/restore application to write objects to the container 150 as deduplicated data. Since the garbage collector is currently in the process of cleaning the containers 140-170, the garbage collector instructs the backup/restore application to write the objects to the container 150 as data that has not been deduplicated.

The data that is written to containers in the current batch 402 is written as data that has not been deduplicated to enable the tracking of dead objects that are being revived. For example, if the backup/restore application wrote the file segment Y to the container 150 as deduplicated data, and the container 150 previously stored the file segment Y as a dead object, the deduplication of data would result in writing metadata, which indicates the revival of the file segment Y, to the container 150 instead of resulting in actually writing the file segment Y again to the container 150. The garbage collector processes the file segments that are actually written to the containers being cleaned as live file segments, such that a file segment that is actually written to a container that will be retained is also retained, and a file segment that is actually written to a container which will have its live file segments copy forwarded to a new container is also copy forwarded to the new container. For example, the backup/restore application writes the file segment Y to the container 150 as duplicate data, and the garbage collector copies the live file segments in the container 150 into the new container 250, and also copies the revived file segment Y in the container 150 into the new container 250. If the backup/restore application had not actually written the file segment Y to the container 150 as duplicate data, then the garbage collector would have failed to retain the revival of the previously dead file segment Y.

If the garbage collector identifies a notification to write to a container that is below the range of containers that the garbage collector is currently cleaning, the garbage collector permits this writing of objects to this container. For example, the garbage collector has already cleaned the containers 180-210, is in the process of cleaning the containers 140-170 in the current batch 402, and then identifies a notification from a backup/restore application to write objects to the container 110 as deduplicated data. Since the garbage collector has not yet begun the process of cleaning the containers 100-130, the garbage collector permits the backup/restore application to write the objects to the container 110 as deduplicated data. The garbage collector applies the hash function 208 to the fingerprints of these file segments written to the container 110, and then sets the bits in the hash vector 304 that correspond to the hashes for the fingerprints of the file segments written to the container 110 because the subsequent processing of container 110 will reference the bits for these file segments.

If the backup/restore application wrote file segment V to the container 110 as deduplicated data, and the container 110 already stored file segment V as a dead object, the deduplication of data would result in not writing the file segment V again to the container 110. However, the garbage collector would identify the L0 references in the write notification for the container 110, which identify the fingerprints of the live L0 data segments in the container 110, apply the hash function 208 to these identified fingerprints to create hashes, and set the bits in the hash vector that correspond to these hashes, thereby retaining the revival of the previously dead file segment V.

FIG. 4 depicts that the garbage collector cleans containers from the log head, which are the higher numbered and more recently created containers in the cleaning range, to the log tail, which are the lower numbered and less recently created containers in the cleaning range. For example, the relatively old container 100 and the relatively new container 200 both store the file segment W, and the garbage collector processes the newer container 200 first, either by retaining the newer container 200 which stores the file segment W or by creating an additional container 220 that stores the file segment W, and then resetting the bit in the hash vector 304 that corresponds to the hash for the fingerprint W of the file segment W. Since the older container 100 was created before the newer container 200 was created, the older container 100 is more likely to store dead segments than the newer container 200, such that the percentage of live segments in the old container 100 is more likely to satisfy the container selection threshold for cleaning than the percentage of live segments in the new container 200. Having reset the bit corresponding to the hash for the fingerprint W after processing the newer container 200, the garbage collector processes the file segment W as a dead segment when determining whether to select the older container 100 for cleaning, which may result in the percentage of live segments in the older container 100 satisfying the container selection threshold for cleaning. In contrast, the garbage collector processing the file segment W as a dead segment for the newer container 200 would be less likely to result in the percentage of live segments in the newer container 200 satisfying the container selection threshold for cleaning. Consequently, the garbage collector cleaning the newer containers in the cleaning range before cleaning the older containers in the cleaning range is more likely to reclaim some of the storage space occupied by older containers, which would have otherwise remain inefficiently allocated.

DETAILED DESCRIPTION

Since primary storage, which is local relative to a garbage collector, stores individual data segments, the garbage collector can clean the local storage by deleting any individual dead data segments, as described above. A backup/restore application can reduce local storage costs by transmitting a group of data segments as an individual transmission object to be stored in secondary storage, which is remote relative to the garbage collector, for long-term retention The backup/restore application can store a local copy of the metadata for the group of data segments that is stored remotely, so that the garbage collector can use the local copy of this metadata to reference the group of data segments instead of spending the time and expenses required to retrieve the group of data segments from remote storage. In this situation, since the remote storage stores groups of data segments, the garbage collector can use the local copy of the metadata to clean the remote storage only by deleting a group of dead data segments that was transmitted as an individual transmission object, as described below, and not by deleting any individual dead data segments within the group of data segments.

A file system can divide a file into file segments, and group file segments into a group, which may be referred to as a compression region or a region, which may be transmitted as a transmission object to remote storage. For example, a file system can group a file's Lp metadata segments into a region, and then group this region with regions of other files' Lp metadata segments to form a Lp metadata container. Then the file system can store the Lp metadata container locally and transmit a copy of the regions of the Lp metadata container as individual transmission objects to remote storage. Since a L0 data container includes a metadata section and individual regions of L0 data segments, the file system stores a copy of the section locally, transmits a copy of the section as an individual transmission object to remote storage, stores each region locally, and transmits each region as an individual transmission object to remote storage.

Figure 5:
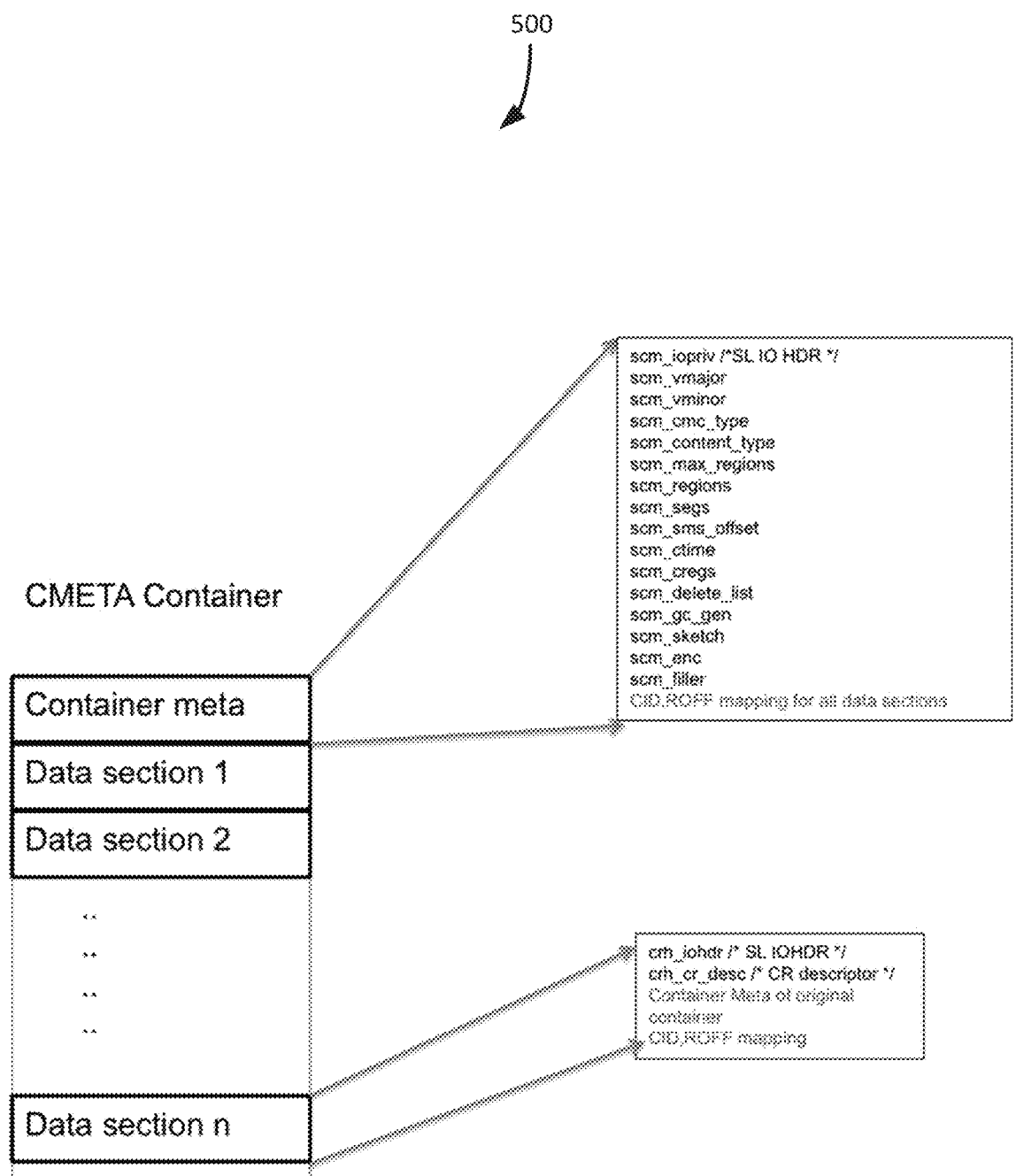
FIG. 5 illustrates a block diagram of an example format of a combined metadata container for garbage collection based on transmission object models, under an embodiment.

The file system can group the metadata of each transmission object to form a combined metadata container, store a local copy of the combined metadata container, and transmit a copy of the combined metadata container as an individual transmission object to remote storage. FIG. 5 depicts an example format 500 of a combined metadata container, which may be referred to a CMETA container.

Figure 2:
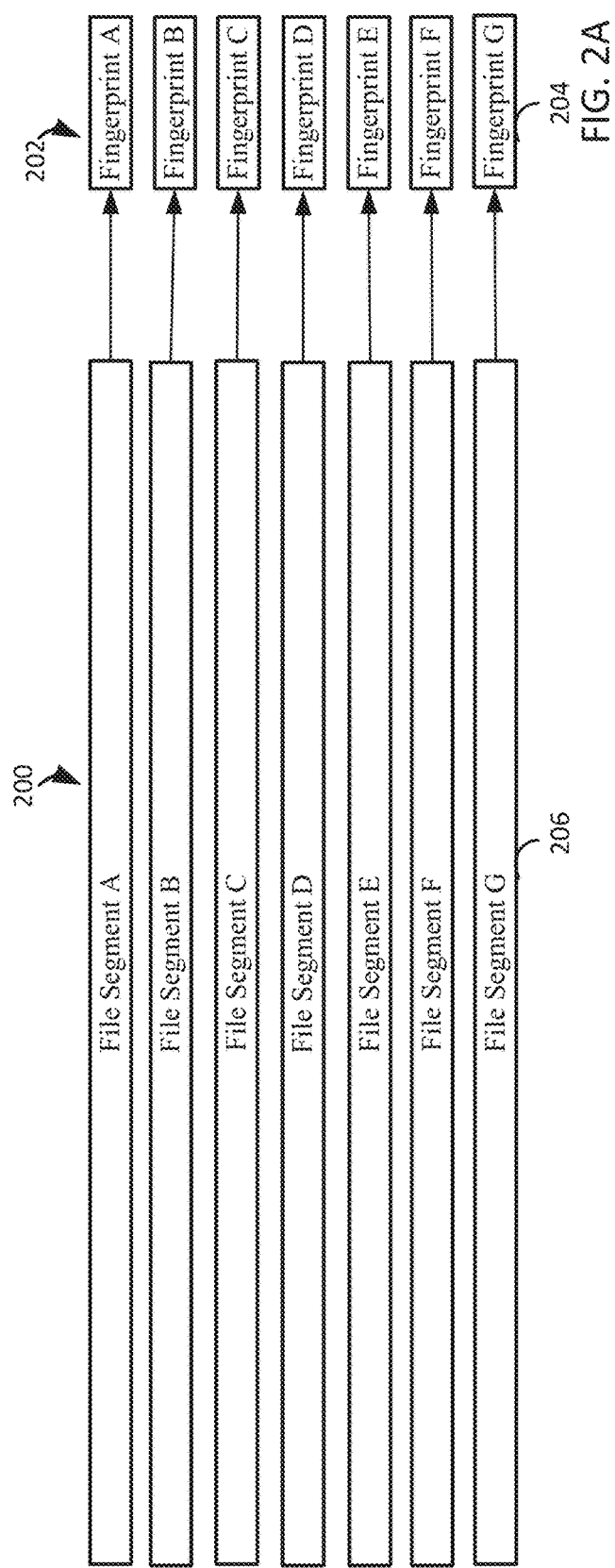
FIGS. 2A-B illustrate a block diagram of example relationships between segments, fingerprints, and bits in a hash vector for garbage collection based on transmission object models, under an embodiment
Figure 3:
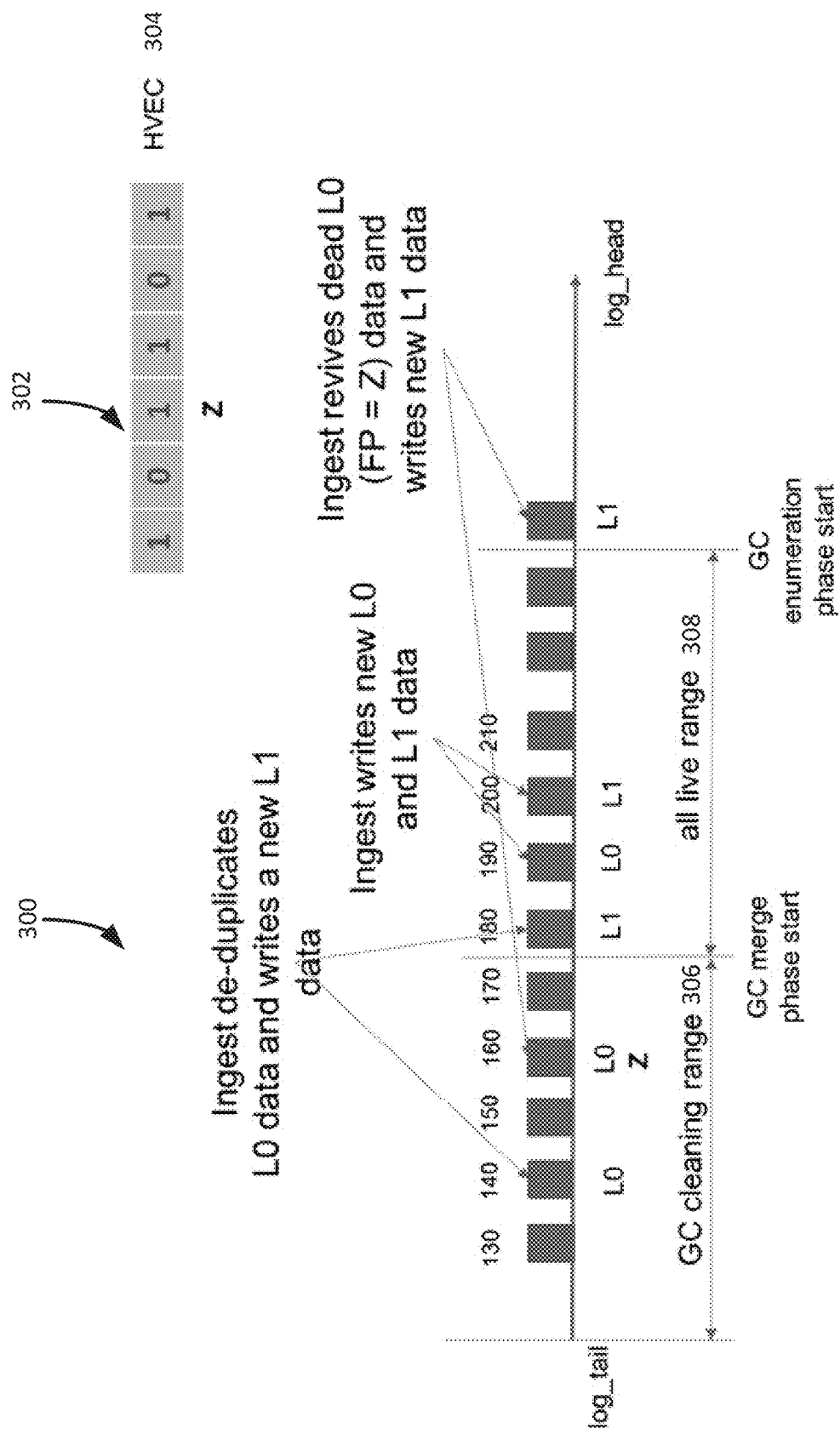
FIG. 3 illustrates a block diagram of containers for garbage collection based on transmission object models, under an embodiment.
Figure 4:
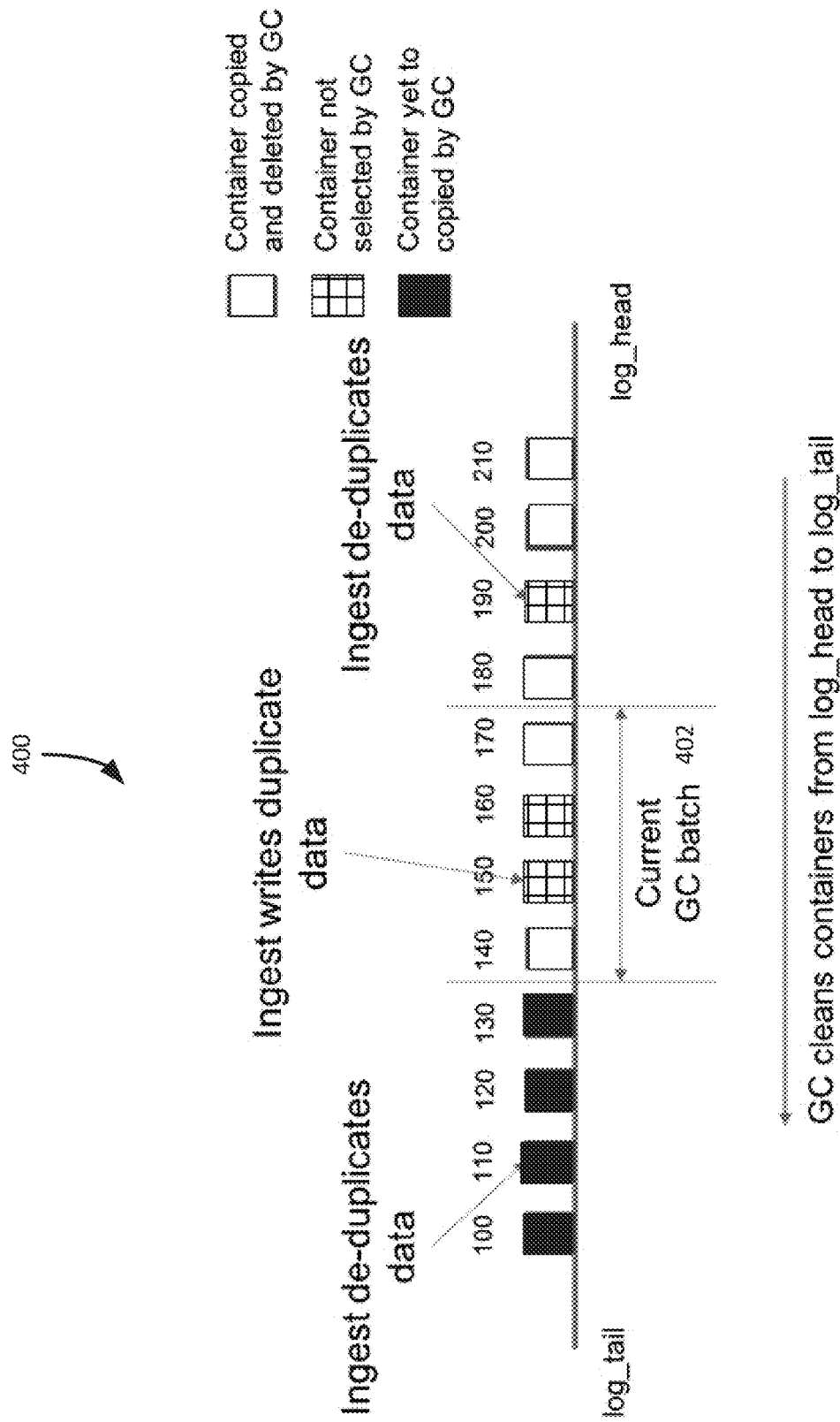
FIG. 4 illustrates another block diagram of containers for garbage collection based on transmission object models, under an embodiment.

A garbage collector can begin by executing what may be referred to as a merge phase, which includes recording unique identifiers of a computer system's objects, such as by accessing the local copy of the combined metadata container and by storing an index of fingerprints for the file segments identified by the local copy of the combined metadata container to a disk. The garbage collector can continue by executing what may be referred to as an analysis phase, which includes applying a hash function to each fingerprint in the fingerprint index to generate a hash vector, such that the bits of the hash vector correspond to the fingerprints that uniquely identify their file segments. For example, FIG. 2B depicts that the garbage collector applies the hash function 208 to the fingerprints 210 to generate the hash vector 212. The garbage collector can continue by executing what may be referred to as an enumeration phase, which includes identifying which objects are live, and then indicating these identifications in the bits of the hash vector that correspond to the objects' unique identifiers. For example, the garbage collector reviews data sections in the combined metadata container 500 to identify metadata of local Lp metadata containers and metadata of remote L0 data containers, which include the fingerprints of the live segments in the local Lp metadata containers and the remote L0 data containers. Then the garbage collector can continue the enumeration phase by applying the hash function 208 to these identified fingerprints to create hashes, and then setting the bits in the hash vector that correspond to these hashes, such as setting some of the bits 302 to 1 in the hash vector 304 depicted by FIG. 3.

The garbage collector can continue by executing what is referred to as a selection phase, which includes estimating how much of the data storage in each container is for live objects. For example, the garbage collector reviews data sections in the combined metadata container 500 to identify the fingerprints for the Lp metadata segments in the local metadata container 130, applies the hash function 208 to these identified fingerprints to create hashes, and then checks the bits in the hash vector 304 that correspond to these hashes. If the bit for a fingerprint's hash is set to 1 in the hash vector 304, then the bit corresponds to a fingerprint of a live object. If the bit for a fingerprint's hash is not set to 1, or is reset to 0, in the hash vector 304, then the bit corresponds to a fingerprint of a dead object.

As part of the selection phase, the garbage collector can continue by selecting a container for garbage collection, which may be referred to as cleaning, based on the number of regions of objects in the container that are regions that store any live objects. For example, if the garbage collector has determined that only 10% of the regions of metadata segments in the local metadata container 130 are dead regions, which are regions that do not store any metadata segments that are in use by any of the computer system's programs, then the garbage collector bypasses selection of the local metadata container 130 for garbage collection or cleaning, and therefore retains the local metadata container 130 as it is. Continuing this example, the garbage collector resets the bits in the hash vector 304 that correspond to the hashes of the fingerprints for the metadata segments in the local metadata container 130, which enables the subsequent processing of local metadata containers to not require retention of these metadata segments, which may be referenced as duplicates in other local metadata containers.

In an alternative example, if the garbage collector has determined that 40% of the regions of metadata segments in the local metadata container 130 are dead regions, then the garbage collector selects the local metadata container 130 for garbage collection or cleaning. The garbage collector may evaluate multiple local metadata containers in the cleaning range 306 to select any combination of these local metadata containers in the cleaning range 306 for garbage collection or cleaning. Although the example describes 40% of a local metadata container's dead regions as exceeding a cleaning criteria or container selection threshold, any cleaning criteria or container selection threshold may be used.

The garbage collector can continue by executing what may be referred to as a copy phase, which includes copying regions of live objects from a selected container that will be reclaimed into another container that will be retained. Continuing the alternative example, the garbage collector creates a new local metadata container 250, copies the live regions in the local metadata container 130, the live regions in the local metadata container 150, and the live regions in the local metadata container 170 into the new local metadata container 250, and resets the bits in the hash vector 304 that correspond to the hashes for the fingerprints of the metadata segments in the new local metadata container 250, which enables the subsequent processing of local metadata containers to not require retention of these metadata segments. Then the garbage collector deletes the old local metadata containers. For example, the garbage collector deletes the old local metadata containers 130, 150, and 170 as part of a cleaning or a garbage collection that reclaims unused storage space for subsequent reuse.

Then the garbage collector transmits a copy of each new local Lp metadata container as an individual transmission object to remote storage. For example, the garbage collector transmits the new local metadata containers 250 and 270 to cloud storage. Next the garbage collector creates a new local combined metadata container, copies the metadata sections of the new local Lp metadata containers to the new local combined metadata container, and transmits a copy of the new local combined metadata container as an individual transmission object to the remote storage. For example, the garbage collector creates a new version of the combined metadata container 500, copies the metadata sections of the new local metadata containers 250 and 270 to the new version of the combined metadata container 500, and transmits a copy of the new version of the combined metadata container 500 as an individual transmission object to the cloud storage.

For any region in any remote L0 data container that stores any live segments, the garbage collector copies the data section in the old local combined metadata container for any region that stores live segments to a newly created local combined metadata container, and then transmits a copy of the newly created local combined metadata container as an individual transmission object to the remote storage. For example, the garbage collector identifies the regions of the remote L0 data container 120 that store live data segments, the regions of the remote L0 data container 140 that store live data segments, and the regions of the remote L0 data container 160 that store live data segments. Therefore, the garbage collector copies the data sections for the live regions of the remote L0 data container 120, the live regions of the remote L0 data container 140, and the live regions of the remote L0 data container 160 from the old version of the local combined metadata container 500 to the new version of the local combined metadata container 500, and transmits a copy of the new version of the local combined metadata container 500 as an individual transmission object to cloud storage. The garbage collector deletes the old local combined metadata containers and transmits instruction to the remote storage to delete the old remote combined metadata containers, thereby deleting the old version of the local combined metadata container 500 and the old version of the remote combined metadata container 500.

Having compiled information that identifies any region in any remote L0 data container that does not store any live segments, the garbage collector uses this information to transmit instructions to the remote storage to use this information to delete any region in any remote L0 data container that does not store any live segments. For example, the garbage collector instructs the cloud storage to delete the dead regions of the remote L0 data container 120, the dead regions of the remote L0 data container 140, and the dead regions of the remote L0 data container 160. Consequently, the garbage collector is able to reclaim free space in the remote storage by cleaning the remote L0 containers at the level of a region, which is transmitted as an individual transmission object, without having to retrieve any L0 data segments from the remote storage or transmit any L0 data segments to the remote storage.

Since the garbage collector deletes dead data segments from remote storage by deleting regions of remote L0 data containers, and each region of a remote L0 data container was transmitted to remote storage as an individual transmission object, the cleaning is dependent upon the individual transmission object. After a file is deleted, the probability of a relatively small transmission object not storing any live segments is high, because the segments are written continuously in a region. However, the probability of a relatively large transmission object not storing any live segments is low after a file is deleted, because there is a high probability that at least one of the relatively large number of segments stored by the relatively large object will be revived, thus reviving the relatively large object. Even if one segment is live within a transmission object, the garbage collector cannot send instructions to remote storage to free dead space from a remote copy of that transmission object. Therefore, the garbage collector is not very efficient for cleaning dead space in remote copies of relatively large transmission objects.

A file system may transmit a transmission object that is relatively small, such as 64 kb, to remote storage. The relatively small size of the transmission object size poses several challenges, such as increasing transaction costs due to the file system transmitting a relatively large number of small objects to remote storage. Furthermore, remote storage providers store a relatively large amount of metadata to represent the relatively large number of small objects. Additionally, a file system transmitting a relatively large number of small objects to remote storage limits the data-movement throughput due to the relatively large number of corresponding PUT operations to remote storage. Consequently, a file system may transmit a transmission object that is large enough to include multiple regions, such as 4.5 mb, to remote storage, which reduces transaction costs, reduces the remote storage provider's amount of metadata, and improves the data-movement throughput. The file system can generate a metadata section that is a part of a relatively large transmission object. The metadata section can describe the relatively large transmission object, such as the fingerprints of each file segment in the transmission object, the number of regions, and the (offset, size) tuple of each region in the transmission object. Therefore, a garbage collector requires modifications to become more efficient for cleaning dead space in remote copies of relatively large transmission objects.

Embodiments herein provide garbage collection based on transmission object models. A system generates a data structure based on unique identifiers of objects in object storages, wherein positions in the data structure correspond to hashes of the unique identifiers of the objects in the object storages. The system sets indicators in positions in the data structure which correspond to hashes of unique identifiers of active objects in the object storages. If the number of regions of active data objects in a first data storage and the number of regions of active data objects in a second data storage each fail to satisfy a data threshold, then the system creates a model that includes information which identifies locations and sizes of regions of active data objects in the first data storage and regions of active data objects in the second data storage. The sum of the sizes satisfies a model size range. The system resets indicators in positions in the data structure which correspond to hashes of unique identifiers of active data objects associated with the model. The system transmits the model to remote storage, which enables the remote storage to copy the regions of the active data objects in the first data storage and the regions of the active data objects in the second data storage to a third data storage, and to delete the first data storage and the second data storage. 802

For example, a garbage collector accesses a local copy of a combined metadata container and stores an index of fingerprints for the file segments identified by the local copy of the combined metadata container to a disk on a backup server, and then applies a hash function to the fingerprints to generate a hash vector. The garbage collector reviews data sections in a combined metadata container to identify metadata of local metadata containers and remote data containers, which include the fingerprints of the live segments in the local metadata containers and the remote data containers, and then sets the bits in the hash vector that correspond to the hashes created by applying the hash function to the fingerprints of the live segments in the local metadata containers and the remote data containers. The garbage collector reviews data sections in the local combined metadata container to identify the fingerprints for the remote data segments in the remote data containers 120, 140, and 160, applies the hash function to these identified fingerprints to create hashes, and then checks the bits in the hash vector that correspond to these hashes. If the bit for a fingerprint's hash is set to 1 in the hash vector, then the bit corresponds to a fingerprint of a live data object. If the bit for a fingerprint's hash is not set to 1, or is reset to 0, in the hash vector, then the bit corresponds to a fingerprint of a dead data object.

Since 40% of the regions of data segments in each of the remote data containers 120, 140, and 160 are dead regions, the garbage collector creates a transmission object model, which identifies the locations and sizes of the regions of the remote data container 120 that store live data segments, the regions of the remote data container 140 that store live data segments, and the regions of the remote data container 160 that store live data segments. The size of the live regions of the remote data container 120 is 38 kb, the size of the live regions of the remote data container 140 is 37 kb, the size of the live regions of the remote data container 120 is 36 kb, and the model size range is 100 to 120 kb. The garbage collector resets the bits in the hash vector that correspond to the hashes of the fingerprints for the data segments in the remote data containers 120, 140, and 160. The garbage collector transmits the transmission object model to the cloud storage, which enables the cloud storage to copy the regions of the remote data container 120 that store live data segments, the regions of the remote data container 140 that store live data segments, and the regions of the remote data container 160 that store live data segments to a newly created remote data container 260, and to delete the remote data container 120, the remote data container 140, and the remote data container 160.

Figure 6:
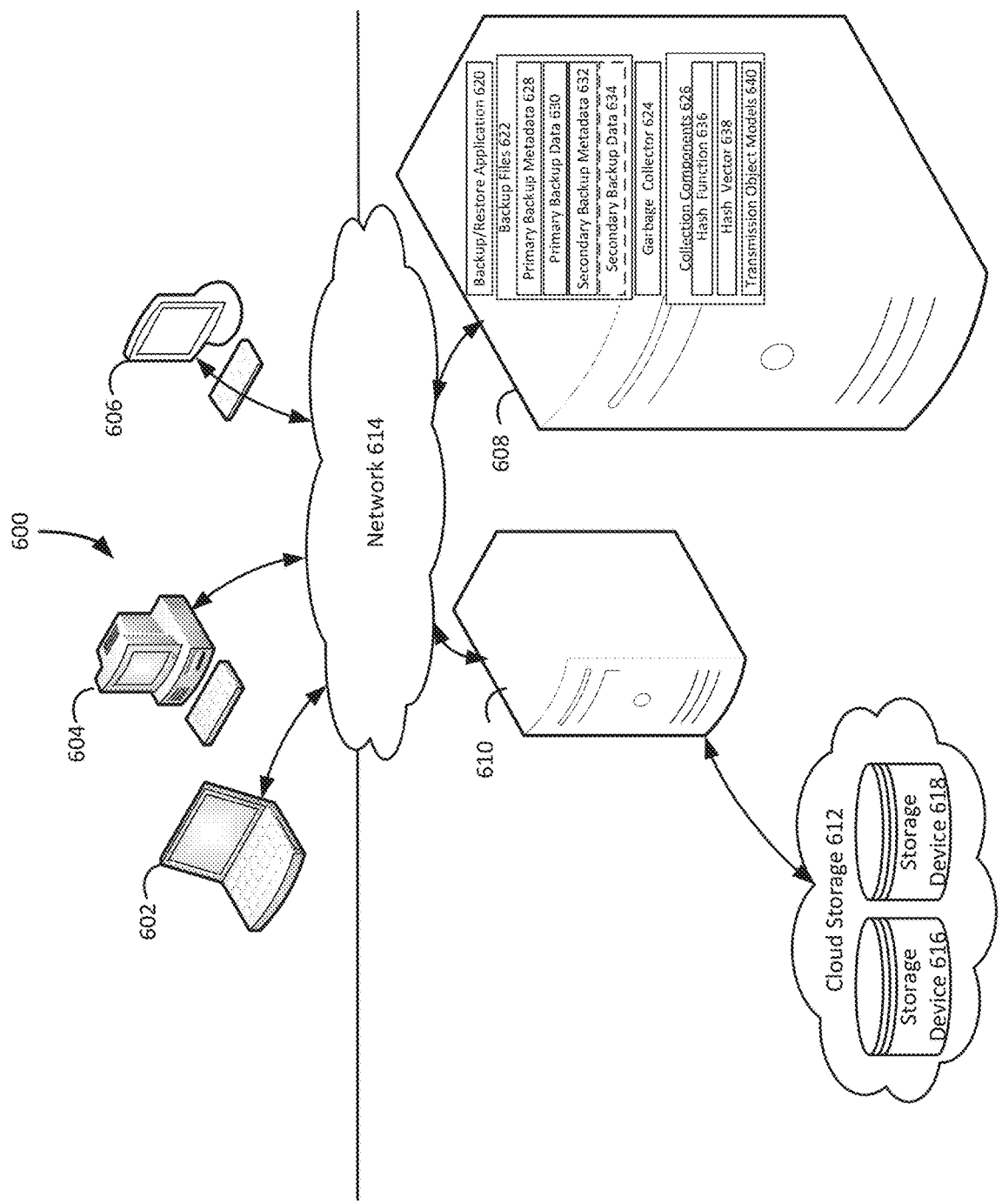
FIG. 6 illustrates a block diagram of an example system for garbage collection based on transmission object models, under an embodiment.

FIG. 6 illustrates a block diagram of a system that implements garbage collection based on transmission object models, under an embodiment. As shown in FIG. 6, system 600 may illustrate a cloud computing environment in which data, applications, services, and other resources are stored and delivered through shared data-centers and appear as a single point of access for the users. The system 600 may also represent any other type of distributed computer network environment in which servers control the storage and distribution of resources and services for different client users.

In an embodiment, the system 600 represents a cloud computing system that includes a first client 602, a second client 604, and a third client 606; and a first server 608, a second server 610, and a cloud storage 612 that may be provided by a hosting company. Although FIG. 6 depicts the first client 602 as a laptop computer 602, the second client 604 as a personal computer 604, and the third client 606 as an Apple® Macintosh computer 606, each of the clients 602-606 may be any type of computer, such as a server. The clients 602-606 and the servers 608-610 communicate via a network 614. The cloud storage 612 includes a first storage device 616 and a second storage device 618.

The first server 608 includes a backup/restore application 620, backup files 622, a garbage collector 624, and collection components 626. The backup files 622 include primary backup metadata 628, primary backup data 630, and secondary backup metadata 632, and sometimes include secondary backup data 634. The collection components 630 include a hash function 636, a hash vector 638, and a transmission object model 640. A hash function generally refers to an expression that can be used to map data of arbitrary size to data of a fixed size. Each of the components 620-640 may be combined into larger components and/or divided into smaller components.

The hash function 636 may be a perfect hash function, which is a collision-free hash function that maps a key set of size N to a vector of size M, where M>N. A perfect hash function for a known key set is created by applying different hash functions that map the known key set to a vector of the specified size until a hash function is identified that maps the known key set to the vector without any collisions. FIG. 2B depicts a perfect hash function 208 that maps 7 fingerprints 210 to the 10-bit hash vector 212 without any collisions. Creating the perfect hash function 208 may require several iterations to map 7 keys to 10 positions without any collisions. As the value of M increases, the time required to create a perfect hash vector reduces because more positions in the hash vector can accommodate the N keys, but more space is required for the increased size of the hash vector. The load factor used to implement a perfect hash vector is the ratio of N to M, such as a load factor of 7/10 means that for every N=7 keys in the system, the perfect hash function reserves m=10 bits for the perfect hash vector. For example, if the garbage collector identified 70 million file segments in a computer system, and the predetermined load factor is 7 keys to 10 bits, then the garbage collector would allocate a 100 million-bit hash vector, and may also allocate 100 million bits for the perfect hash vector. However, since not all of the file segments in the computer system are live, the actual load factor is usually smaller than the initial load factor.

FIG. 6 depicts the system 600 with three clients 602-606, two servers 608-610, one cloud storage 612, one network 614, two storage devices 616-618, one backup/restore application 620, one set of backup files 622, one garbage collector 624, and one set of collection components 630. However, the system 600 may include any number of clients 602-606, any number of servers 608-610, any number of cloud storages 612, any number of networks 614, any number of storage devices 616-618, any number of backup/restore applications 620, any number of sets of backup files 622, any number of garbage collectors 624, and any number of sets of collection components 630. The clients 602-606 and the servers 608-610 may each be substantially similar to the system 900 depicted in FIG. 9 and described below in reference to FIG. 9.

FIG. 6 depicts the backup/restore application 620 residing completely on the first server 608, but the backup/restore application 620 may reside completely on any of the clients 602-606, completely on another server that is not depicted in FIG. 6, or in any combination of partially on the first server 608, partially on the clients 602-606, and partially on the other server. The backup/restore application 620 may provide a plug-in to any of the clients 602-606 and/or the first server 608 that enables any of the clients 602-606 and/or the first servers 608 to execute the commands to back up and restore a data object. Even though the following paragraphs describe EMC Corporation's NetWorker® backup/restore application and EMC Corporation's Avamar® backup/restore application as examples of the backup/restore application 620, the backup/restore application 620 may be any other backup/restore application which provides the backup/restore functionalities described in the Background section.

Figure 1:
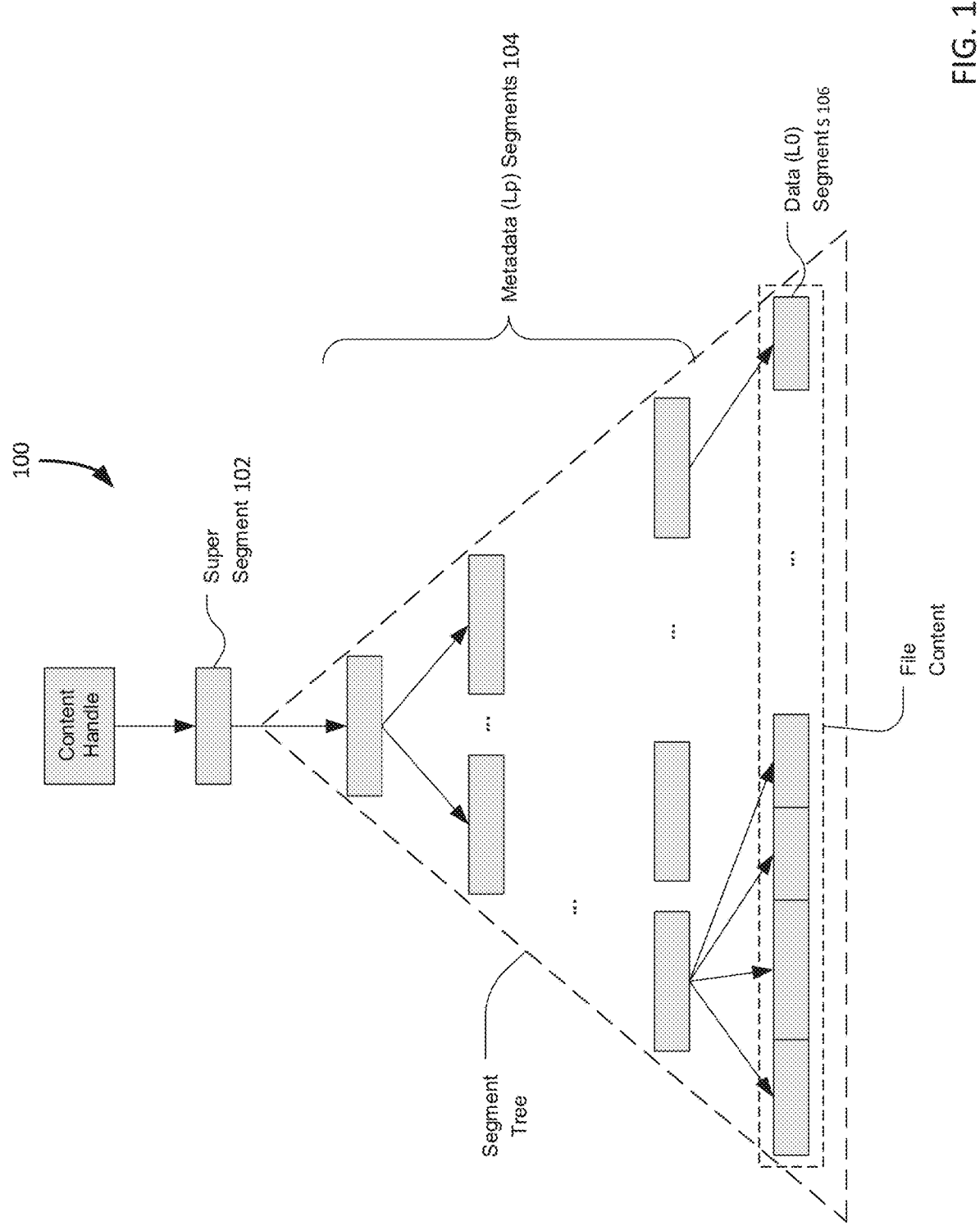
FIG. 1 illustrates a block diagram of an example data structure for garbage collection based on transmission object models, under an embodiment.

The backup/restore application 620 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 620 may also be implemented as a NetWorker® Module For Microsoft Applications, which, as stated above, may reside completely on of the first server 608, completely on any of the clients 602-606, completely on another server that is not depicted in FIG. 1, or in any combination of partially on the first server 608, partially on the clients 602-606, and partially on the other server.

The backup/restore application 620 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup data sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The first server 608, which may be referred to as the backup server 608, may be configured as an EMC Corporation's Data Domain server. The Data Domain operating system delivers scalable, high-speed, and cloud-enabled protection storage for backup, archive, and disaster recovery. Data Domain employs variable-length deduplication to minimize disk requirements, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

The second server 610, which may be referred to as a cloud storage gateway 610, may be a network appliance or server which resides at a customer's premises, and can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System interface (iSCSI), Fibre Channel, and file-based interfaces such as Network File System (NFS) and Server Message Block (SMB), one version of which is also known as Common Internet File System (CIFS). A file system interface may be an API (application programming interface) through which a utility or user program requests the storing and retrieving of data. The cloud storage gateway 610 can also serve as an intermediary to multiple cloud storage providers. The cloud storage 612 may be a Google® cloud platform, an Amazon Web Services® cloud platform, a Microsoft® Azure cloud platform, or any other cloud platform.

The garbage collection based on transmission object models can begin by generating a data structure based on unique identifiers of objects in object storages, wherein positions in the data structure correspond to hashes of the unique identifiers of the objects in the object storages. Generating the data structure can include storing an index of unique identifiers of the objects in the object storages.

A data structure generally refers to an information organization and storage format that enables efficient access and modification. A unique identifier generally refers to a sequence of characters used to refer to an entity as being the only one of its kind. An object generally refers to a group of information. An object storage generally refers to a portion of any data retention device that retains a group of information. A position generally refers to a particular place where something is located. A hash generally refers to a value returned by an expression that can be used to map data of arbitrary size to data of a fixed size. An index generally refers to be an ordered list of elements, with references to the locations where the elements are stored.

The merge phase includes storing an index of unique identifiers of the objects in the object storages. For example, during the merge phase the garbage collector 624 accesses the local copy of the combined metadata container 500 and stores an index of the fingerprints 210 for the file segments in the backup files 622 identified by the local copy of the combined metadata container 500 to a disk on the backup server 608. If the file segments in the backup files 622 include the primary backup metadata 628 and the primary backup data 630, then the garbage collection may be referred to as a cleaning of the active tier. If the file segments in the backup files 622 include the secondary backup metadata 632 and the secondary backup data 634, then the garbage collection may be referred to as a cleaning of the cloud tier. Cleaning of the cloud tier may require the backup server 608 to retrieve the secondary backup data 634 from the cloud storage 612 via the gateway server 610, and to return the secondary backup data 634 to the cloud storage 612 via the gateway server 610. However, the garbage collection based on transmission object models can clean the cloud tier 612 without retrieving the secondary backup data 634 from the cloud storage 612 via the gateway server 610, and without returning the secondary backup data 634 to the cloud storage 612 via the gateway server 610.

After storing the index of unique identifiers of the objects in the object storages, the analysis phase is executed, which includes generating a data structure based on unique identifiers of the objects in the object storages, wherein positions in the data structure correspond to hashes of the unique identifiers of the objects in the object storages. For example, the garbage collector 624 applies the hash function 636 to the fingerprints 210 to generate the hash vector 638, which may be a perfect hash vector.

Following the generation of the data structure, the enumeration phase is executed, which includes setting indicators in positions in the data structure which correspond to hashes of unique identifiers of active objects in the object storages. Setting the indicators in the positions in the data structure can include identifying the unique identifiers of the active objects by reviewing metadata associated with the objects in the object storages, and then generating hashes of the unique identifiers of the active objects.

An indicator generally refers to a thing that provides specific information about the state or condition of something in particular. An active object generally refers to a group of information that is used by at least one program in a computer system. Metadata generally refers to a set of information that describes other information.

The enumeration phase begins by identifying the unique identifiers of the active objects by reviewing metadata associated with the objects in the object storages. For example, the garbage collector 624 reviews data sections in the local combined metadata container 500 to identify metadata of local Lp metadata containers and metadata of remote L0 data containers, which include the fingerprints of the live segments in the local Lp metadata containers and the remote L0 data containers. The enumeration phase continues by generating hashes of the unique identifiers of the active objects, and then setting indicators in positions in the data structure which correspond to hashes of the unique identifiers of the active objects in the object storages. For example, the garbage collector 624 sets the bits in the hash vector 638 that correspond to the hashes created by applying the hash function 636 to the live fingerprints in the local Lp metadata containers and the remote L0 data containers.

Having set indicators in positions in the data structure, the selection phase is executed, which can include determining whether the number of regions of active metadata objects in a first metadata storage satisfies a metadata threshold. A number generally refers to an arithmetical value, expressed by a word, symbol, or figure, representing a particular quantity, and used in counting and making calculations. A region generally refers to a group or an area, such as a group of objects. An active metadata object generally refers to a group of information that describes other information and that is used by at least one program in a computer system. A metadata storage generally refers to a portion of any data retention device that retains a group of information that describes other information. A metadata threshold generally refers to the magnitude that must be satisfied by a set of information that describes other information for a certain reaction, phenomenon, result, or condition to occur or be manifested.

For example, the garbage collector 624 reviews data sections in the local combined metadata container 500 to identify the fingerprints for the Lp metadata segments in the local metadata container 130, apply the hash function 636 to these identified fingerprints to create hashes, and then check the bits in the hash vector 638 that correspond to these hashes. If the bit for a fingerprint's hash is set to 1 in the hash vector 638, then the bit corresponds to a fingerprint of a live metadata object. If the bit for a fingerprint's hash is not set to 1, or is reset to 0, in the hash vector 638, then the bit corresponds to a fingerprint of a dead metadata object.

Continuing the example, if the garbage collector 624 has determined that only 10% of the regions of metadata segments in the local metadata container 130 are dead metadata regions, then the garbage collector 624 bypasses selection of the local metadata container 130 for cleaning, and therefore retains the local metadata container 130 as it is. Further to this example, the garbage collector 624 resets the bits in the hash vector 638 that correspond to the hashes of the fingerprints for the metadata segments in the local metadata container 130, which enables the subsequent processing of local metadata containers to not require retention of these metadata segments, which may be referenced as duplicates in other local metadata containers. Although this example describes the number of regions of active metadata objects as a percentage of dead metadata segments, any relative or absolute number of the regions of active metadata objects may be used.

In an alternative example, if the garbage collector 624 has determined that 40% of the regions of metadata segments in the local metadata container 130 are dead regions, then the garbage collector 624 selects the local metadata container 130 for cleaning. The garbage collector 624 may evaluate multiple local metadata containers in a cleaning range to select any combination of these local metadata containers in the cleaning range for cleaning.

Following a determination that the number of the regions of the active metadata objects in the first metadata storage does not satisfy a metadata threshold, the copy phase is executed, which can include copying the regions of the active metadata objects from the first metadata storage to a second metadata storage, and resetting the indicators in the positions in the data structure which correspond to the hashes of the unique identifiers of the active metadata objects copied to the second metadata storage. Continuing the alternative example, the garbage collector 624 creates the new local metadata container 250, and then copies the live metadata segments in the local metadata container 130, the live metadata segments in the local metadata container 150, and the live metadata segments in the local metadata container 170 into the new local metadata container 250. Then the garbage collector 624 resets the bits in the hash vector 638 that correspond to the hashes for the fingerprints of the metadata segments in the new local metadata container 250, which enables the subsequent processing of local metadata containers to not require retention of these metadata segments. Then the garbage collector 624 deletes the old local metadata containers 130, 150, and 170, which is a cleaning that reclaims unused storage space for subsequent reuse.

Having created at least one new metadata container, a copy of each new metadata container can be transmitted as an individual transmission object to remote storage, and remote storage can be instructed to delete any corresponding old remote metadata container. For example, the garbage collector 624 transmits the new metadata containers 250 and 270 to cloud storage 612, which is instructed to delete the old remote metadata containers 130, 150, and 170, which is a cleaning that reclaims unused storage space for subsequent reuse. After updating any new metadata containers, a new combined metadata container can be created, the metadata sections of any new metadata containers can be copied to the new combined metadata container, and then a copy of the new combined metadata container can be transmitted as an individual transmission object to the remote storage. For example, the garbage collector 624 creates a new version of the local combined metadata container 500, copies the metadata sections of the new local metadata containers 250 and 270 to the new version of the local combined metadata container 500, and transmits a copy of the new version of the local combined metadata container 500 as an individual transmission object to the cloud storage 612.

Following the setting of indicators in positions in the data structure, the selection phase is executed, which includes determining whether the number of regions of active data objects in a first data storage and the number of regions of active data objects in a second data storage each fail to satisfy a data threshold. For example, the garbage collector 624 reviews data sections in the local combined metadata container 500 to identify the fingerprints for the remote L0 data segments in the remote data containers 120, 140, and 160, applies the hash function 636 to these identified fingerprints to create hashes, and then checks the bits in the hash vector 638 that correspond to these hashes. If the bit for a fingerprint's hash is set to 1 in the hash vector 638, then the bit corresponds to a fingerprint of a live data object. If the bit for a fingerprint's hash is not set to 1, or is reset to 0, in the hash vector 638, then the bit corresponds to a fingerprint of a dead data object.

An active data object generally refers to a set of information that is used by at least one program in a computer system. A data storage generally refers to a portion of any information retention device that retains a set of information. A data threshold generally refers to the magnitude that must be satisfied by a set of information for a certain reaction, phenomenon, result, or condition to occur or be manifested.

Continuing the example, if the garbage collector 624 has determined that only 10% of the regions of data segments in each of the remote data containers 120, 140, and 160 are dead metadata regions, then the garbage collector 624 bypasses selection of the remote containers 120, 140, and 160 for cleaning, and therefore retains the remote data container containers 120, 140, and 160 as they are. Further to this example, the garbage collector 624 can reset the bits in the hash vector 638 that correspond to the hashes of the fingerprints for the data segments in the remote data containers 120, 140, and 160, which enables the subsequent processing of remote data containers to not require retention of these data segments, which may be referenced as duplicates in other remote data containers. Although this example describes the number of regions of active data objects as a percentage of dead data segments, any relative or absolute number of the regions of active data objects may be used.

In an alternative example, if the garbage collector 624 has determined that 40% of the regions of data segments in each of the remote data containers 120, 140, and 160 are dead regions, then the garbage collector 624 selects the remote data containers 120, 140, and 160 for cleaning. The garbage collector 624 may evaluate multiple remote data containers in a cleaning range to select any combination of these remote data containers in the cleaning range for cleaning. Although the previous examples described selecting none of a set of data storages for cleaning or all of a set of data storages for cleaning, the garbage collector 624 may select any combination of a set of data storages for cleaning, and not select any combination of a set of data storages for cleaning. For example, if the garbage collector 624 has determined that 40% of the regions of data segments in each of the remote data containers 120 and 160 are dead regions, and that 10% of the regions of data segments in the remote data container 140 are dead regions, then the garbage collector 624 selects the remote data containers 120 and 160 for cleaning.

If the number of regions of active data objects in the first data storage and the number of regions of active data objects in the second data storage each fail to satisfy the data threshold, then a model is created, which includes information that identifies the locations and the sizes of the regions of the active data objects in the first data storage and the regions of the active data objects in the second data storage, wherein a sum of the sizes satisfies a model size range. For example, the garbage collector 624 creates the transmission object model 640, which uses (source_object_ID, offset, size) tuples to identify the locations and the sizes of the regions of the remote L0 data container 120 that store live data segments, the regions of the remote L0 data container 140 that store live data segments, and the regions of the remote L0 data container 160 that store live data segments. For this example, the size of the live regions of the remote L0 data container 120 is 38 kb, the size of the live regions of the remote L0 data container 140 is 37 kb, the size of the live regions of the remote L0 data container 120 is 36 kb, and the model size range is 100 to 120 kb.

When the garbage collector 624 initially attempts to use only the remote L0 data container 120 and the remote L0 data container 140 to create the transmission object model 640, the modeling fails because the sum of the sizes of these remote data containers is 75 kb, which is less than the model size range of 100 to 120 kb. When the garbage collector 624 attempts to use the remote L0 data container 120, the remote L0 data container 140, and the remote L0 data container 160 to create the transmission object model 640, the modeling succeeds because the sum of the sizes of these remote data containers is 111 kb, which is in the model size range of 100 to 120 kb. Although these examples use three data containers and a model size range of 100 to 120 kb for simplification purposes, the transmission object model 640 can be based on any number of data containers, such as 70 to 224 data containers, and the model size range can include any values, such as 4.44 mb to 4.56 mb.

A model generally refers to a thing used as an example to follow. Information generally refers to data. A location generally refers to a particular place or position. A size generally refers to a thing's overall dimensions. A sum generally refers to the total amount resulting from the addition of two or more numbers, amounts, or items. A model size range generally refers to the area of variation between upper and lower Hants on a particular scale for the overall dimensions of a thing used as an example to follow.

After creating the model, the indicators are reset in positions in the data structure which correspond to hashes of unique identifiers of active data objects associated with the model. For example, the garbage collector 624 resets the bits in the hash vector 638 that correspond to the hashes of the fingerprints for the data segments in the remote data containers 120, 140, and 160, which enables the subsequent processing of remote data containers to not require retention of these data segments, which may be referenced as duplicates in other remote data containers.

Following the creation of the model, a new combined metadata container can be created, metadata corresponding to the model can be copied to the new combined metadata container, and then a copy of the new combined metadata container can be transmitted as an individual transmission object to the remote storage. For example, the garbage collector 624 creates a new version of the combined metadata container 500, copies metadata for the transmission object model 640 to the new version of the combined metadata container 500, and then transmits a copy of the new version of the combined metadata container 500 as an individual transmission object to the cloud storage 612.

Figure 7:
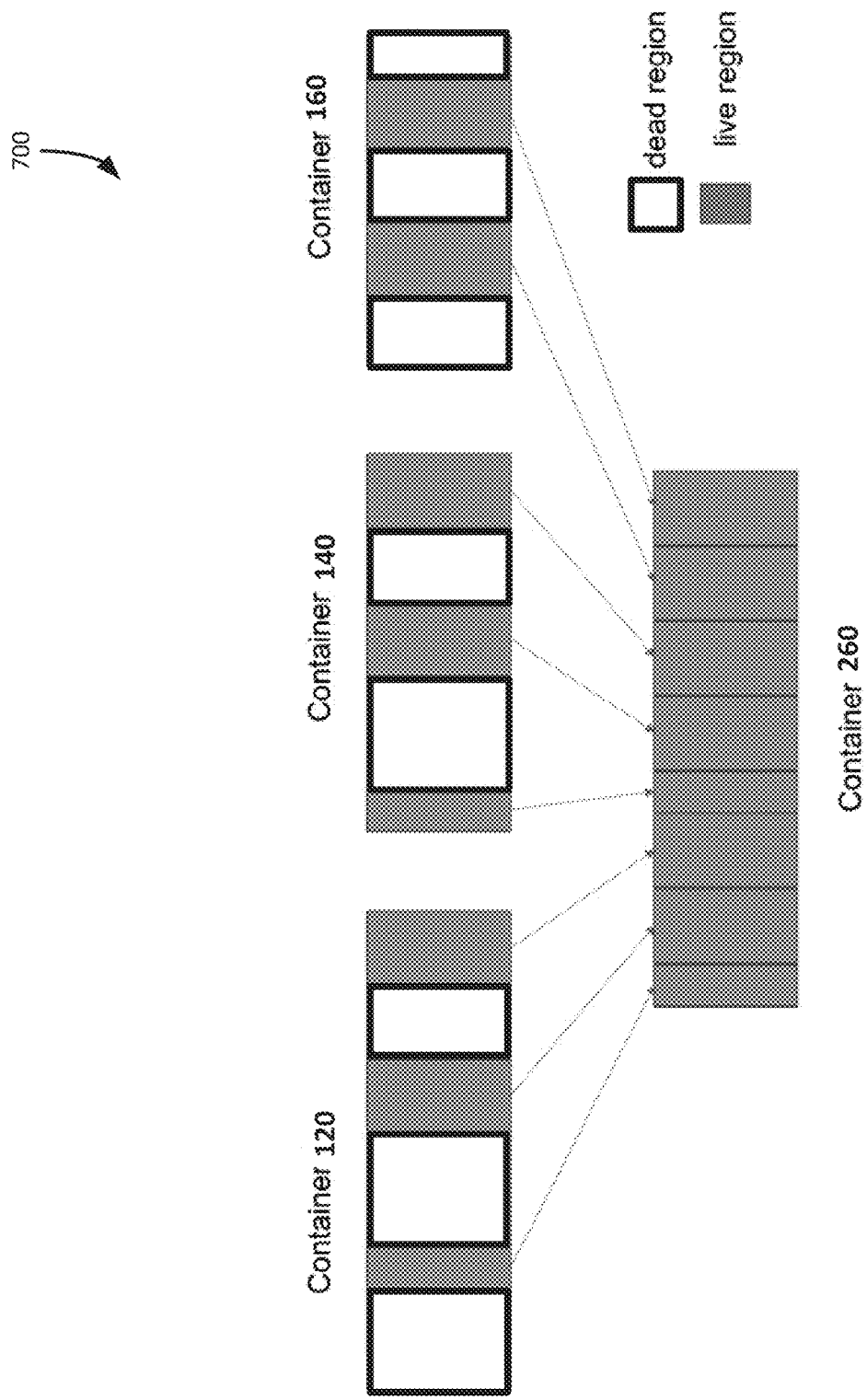
FIG. 7 illustrates yet another block diagram of containers for garbage collection based on transmission object models, under an embodiment.

Having created the model, the model is transmitted to a remote storage, thereby enabling the remote storage to copy regions of active data objects in the first data storage and regions of active data objects in the second data storage to a third data storage, and to delete the first data storage and the second data storage. For example, the garbage collector 624 transmits the transmission object model 640 to the cloud storage 612, which the cloud storage 612 to copy the regions of the remote L0 data container 120 that store live data segments, the regions of the remote L0 data container 140 that store live data segments, and the regions of the remote L0 data container 160 that store live data segments to a newly created remote L0 data container 260, as depicted by FIG. 7, and then to delete the remote L0 data container 120, the remote L0 data container 140, and the remote L0 data container 160. Although this example describes the garbage collector 624 transmitting only one transmission object model 640 to the cloud storage 612, the garbage collector 624 can transmit any number of different versions of the transmission object model 640 to the cloud storage 612.

Consequently, the garbage collector 624 is able to reclaim free space in the cloud storage 612 by cleaning the remote L0 containers at the level of a region, which is transmitted as a subcomponent of an individual transmission object, without having to retrieve any L0 data segments from the cloud storage 612 or transmit any L0 data segments to the cloud storage 612. Since a typical garbage collector could not clean remote data containers at the level of subcomponents of transmission objects, typical garbage collectors are not efficient at cleaning data containers that are transmitted as relatively large transmission objects. In contrast, since the transmission object model 640 enables the cleaning of remote data containers at the level of subcomponents of transmission objects, the garbage collector 624 is efficient at cleaning data containers that are transmitted as relatively large transmission objects. As cleaning continues over time, eventually the garbage collector 624 deletes all of the relatively small transmission objects from the cloud storage 612 by combining them into relatively large transmission objects in the cloud storage 612. All subsequent transmission objects transmitted from the cloud storage 612 or transmitted to the cloud storage 612 will be relatively large transmission objects, thereby reducing transaction costs, reducing the remote storage provider's amount of metadata, and improving the data-movement throughput.

Figure 8:
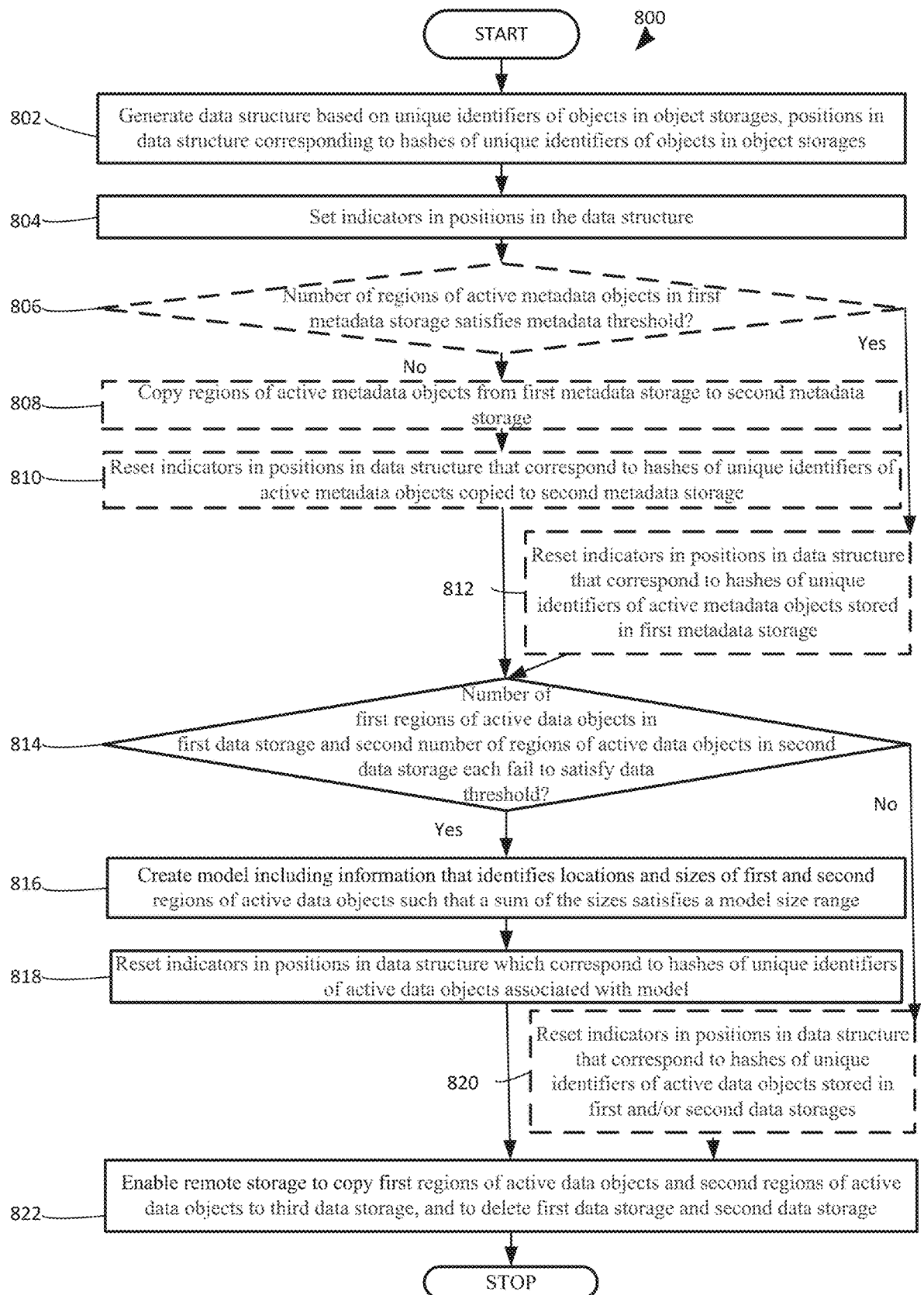
FIG. 8 is a flowchart that illustrates a method for garbage collection based on transmission object models, under an embodiment.

FIG. 8 is a flowchart that illustrates a method for garbage collection based on transmission object models, under an embodiment. Flowchart 800 illustrates method acts illustrated as flowchart blocks for certain steps involved in and/or between the clients 602-606 and/or the servers 608-610 of FIG. 6.

A data structure is generated based on unique identifiers of objects in object storages, wherein positions in the data structure correspond to hashes of the unique identifiers of the objects in the object storages, block 802. The system creates a hash vector for file segments. For example, and without limitation, this can include the garbage collector 624 accessing the local copy of the combined metadata container 500 and storing an index of fingerprints 210 for the file segments identified by the local copy of the combined metadata container 500 to a disk on the backup server 608, and then applying the hash function 636 to the fingerprints 210 to generate the hash vector 638.

After generating the data structure, indicators are set in positions in the data structure which correspond to hashes of unique identifiers of active objects in the object storages, block 804. The system uses live file segments to populate the hash vector. By way of example and without limitation, this can include the garbage collector 624 reviewing data sections in the local combined metadata container 500 to identify metadata of local Lp metadata containers and metadata of remote L0 data containers, which include the fingerprints of the live segments in the local Lp metadata containers and the remote L0 data containers, and then setting the bits in the hash vector 638 that correspond to the hashes created by applying the hash function 636 to the fingerprints of the live segments in the local Lp metadata containers and the remote L0 data containers.

Following the setting of indicators in the data structure for active objects, a determination is optionally made whether a number of regions of active metadata objects n a first metadata storage satisfies a metadata threshold, block 806. The system evaluates whether a metadata container needs to be cleaned. In embodiments, this can include the garbage collector 624 reviewing data sections in the combined metadata container 500 to identify the fingerprints for the Lp metadata segments in the local metadata container 130, apply the hash function 636 to these identified fingerprints to create hashes, and then check the bits in the hash vector 638 that correspond to these hashes. If the bit for a fingerprint's hash is set to 1 in the hash vector 638, then the bit corresponds to a fingerprint of a live metadata object. If the number of regions of active metadata objects in the first metadata storage does not satisfy the metadata threshold, the method 800 continues to block 808 to clean the first metadata object. If the number of regions of active metadata objects in the first metadata storage satisfies the metadata threshold, the method 800 proceeds to block 812 to reset the indicators in the data structure for active metadata objects in the first metadata object.

If the number of regions of active metadata objects in the first metadata storage does not satisfy the metadata threshold, regions of active metadata objects are optionally copied from the first metadata storage to a second metadata storage, block 808. The system copies live file segments in a metadata container being cleaned to a new metadata container. For example, and without limitation, this can include the garbage collector 624 creating the new local metadata container 250, and then copying the live metadata segments in the local metadata container 130, the live metadata segments in the local metadata container 150, and the live metadata segments in the local metadata container 170 into the new local metadata container 250.

Having copied regions of active metadata objects to the second metadata storage, the indicators are optionally reset in positions in the data structure which correspond to the hashes of the unique identifiers of the active metadata objects copied to the second metadata storage, block 810. The system resets the bits in the hash vector for the copied metadata segments. By way of example and without limitation, this can include the garbage collector 624 resetting the bits in the hash vector 638 that correspond to the hashes for the fingerprints of the metadata segments in the new metadata container 250, and then deleting the old metadata containers 130, 150, and 170. Then the method 800 continues to block 814 to determine which remote data containers should be selected for cleaning.

If the number of the regions of active metadata objects in the first metadata storage satisfies the metadata threshold, the indicators are optionally reset in positions in the data structure that correspond to the hashes of the unique identifiers of the active metadata objects stored in the first metadata storage, block 812. The system resets the bits in the hash vector for live metadata segments in a metadata container that does not need cleaning. In embodiments, this can include the garbage collector 624 determining that only 10% of the regions of metadata segments in the local metadata container 130 are dead regions, bypassing selection of the local metadata container 130 for cleaning, and resetting the bits in the hash vector 638 that correspond to the hashes of the fingerprints for the metadata segments in the local metadata container 130.

Following the setting of indicators in positions in the data structure, a determination is made whether the number of regions of active data objects in a first data storage and the number of regions of active data objects in a second data storage each fail to satisfy a data threshold, block 814. The system determines which remote data containers should be selected for cleaning. For example, and without limitation, this can include the garbage collector 624 reviewing data sections in the local combined metadata container 500 to identify the fingerprints for the remote L0 data segments in the remote data containers 120, 140, and 160, applying the hash function 636 to these identified fingerprints to create hashes, and then checking the bits in the hash vector 638 that correspond to these hashes. If the bit for a fingerprint's hash is set to 1 in the hash vector 638, then the bit corresponds to a fingerprint of a live data object. If the bit for a fingerprint's hash is not set to 1, or is reset to 0, in the hash vector 638, then the bit corresponds to a fingerprint of a dead data object. If the number of regions of active data objects in the first data storage and the number of regions of active data objects in the second data storage each fail to satisfy the data threshold, the method 800 continues to block 816 to create a model based on these data storages. If the number of regions of active data objects in the first data storage and the number of regions of active data objects in the second data storage do not each fail to satisfy the data threshold, the method 800 proceeds to block 820 to reset the sh vector bits for the data objects in at least one of the data storages.

If the number of regions of active data objects in the first data storage and the number of regions of active data objects in the second data storage each fail to satisfy the data threshold, then a model is created, which includes information that identifies the locations and the sizes of the regions of the active data objects in the first data storage and the regions of the active data objects in the second data storage, wherein a sum of the sizes satisfies a model size range, block 816. The system creates a model for combining remote data storages. By way of example and without limitation, this can include the garbage collector 624 creating the transmission object model 640, which uses (source_object_ID, offset, size) tuples to identify the locations and the sizes of the regions of the remote L0 data container 120 that store live data segments, the regions of the remote L0 data container 140 that store live data segments, and the regions of the remote L0 data container 160 that store live data segments. For this example, the size of the live regions of the remote L0 data container 120 is 38 kb, the size of the live regions of the remote L0 data container 140 is 37 kb, the size of the live regions of the remote L0 data container 120 is 36 kb, and the model size range is 100 to 120 kb.

After creating the model, the indicators are reset in positions in the data structure which correspond to the hashes of the unique identifiers of the active data objects associated with the model, block 818. The system clears the bits in the hash vector for the remote data segments that will be copied into a new remote data storage. In embodiments, this can include the garbage collector 624 resetting the bits in the hash vector 638 that correspond to the hashes of the fingerprints for the data segments in the remote data containers 120, 140, and 160. Then the method 800 proceeds to the block 822.

If at least one of the number of regions of active data objects in the first data storage and the number of regions of active data objects in the second data storage do not fail to satisfy the data threshold, then indicators are optionally reset in positions in data structure that correspond to the hashes of the unique identifiers of the active data objects stored in the first and/or the second data storages, block 820. The system resets the bits for data segments in remote data containers that are not cleaned. For example, and without limitation, this can include the garbage collector 624 resetting the bits in the hash vector 638 that correspond to the hashes of the fingerprints for the data, segments in the remote data containers 120, 140 and 160.

Having created the model, the model is transmitted to a remote storage provider, thereby enabling the remote storage to copy the regions of the active data objects in the first data storage and the regions of the active data objects in the second data storage to a third data storage, and to delete the first data storage and the second data storage, block 822. The system cleans the remote data storages by combining remote data storages. By way of example and without limitation, this can include the garbage collector 624 transmitting the transmission object model 640 to the cloud storage 612, which enables the cloud storage 612 to copy the regions of the remote L0 data container 120 that store live data segments, the regions of the remote L0 data container 140 that store live data segments, and the regions of the remote L0 data container 160 that store live data segments to a newly created remote L0 data container 260, and then to delete the remote L0 data container 120, the remote L0 data container 140, and the remote L0 data container 160.

Although FIG. 8 depicts the blocks 802-822 occurring in a specific order, the blocks 802-822 may occur in another order. In other implementations, each of the blocks 802-822 may also be executed in combination with other blocks and/or some blocks may be divided into a different set of blocks.

Figure 9:
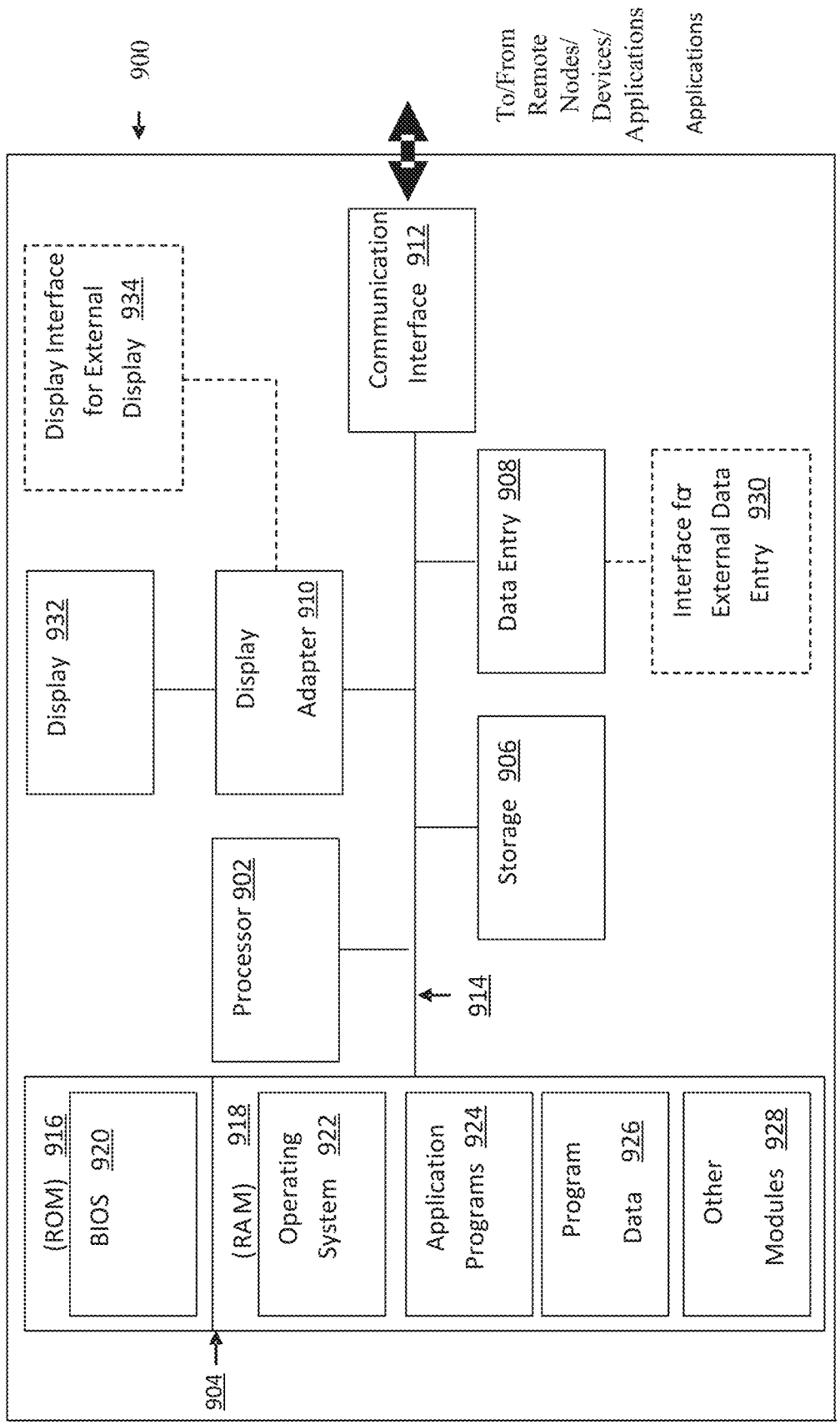
FIG. 9 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 9 may vary depending on the system implementation. With reference to FIG. 9, an exemplary system for implementing the subject matter disclosed herein includes a hardware device 900, including a processing unit 902, memory 904, storage 906, data entry module 908, display adapter 910, communication interface 912, and a bus 914 that couples elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in memory 904 and/or storage 906 and/or received via data entry module 908.

The memory 904 may include read only memory (ROM) 916 and random-access memory (RAM) 918. Memory 904 may be configured to store program instructions and data during operation of device 900. In various embodiments, memory 904 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 904 may also include nonvolatile memory technologies such as nonvolatile flash RAM (NVRAM) or ROM. In some embodiments, it is contemplated that memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 906, ROM 916 or RAM 918, including an operating system 922, one or more applications programs 924, program data 926, and other program modules 928. A user may enter commands and information into the hardware device 900 through data entry module 908. Data entry module 908 may include mechanisms such as a keyboard, a touch screen, a pointing device, etc. Other external input devices (not shown) are connected to the hardware device 900 via external data entry interface 930. By way of example and not limitation, external input devices may include a microphone, joystick, game pad, satellite dish, scanner, or the like. In some embodiments, external input devices may include video or audio input devices such as a video camera, a still camera, etc. Data entry module 908 may be configured to receive input from one or more users of device 900 and to deliver such input to processing unit 902 and/or memory 904 via bus 914.

A display 932 is also connected to the bus 914 via display adapter 910. Display 932 may be configured to display output of device 900 to one or more users. In some embodiments, a given device such as a touch screen, for example, may function as both data entry module 908 and display 932. External display devices may also be connected to the bus 914 via external display interface 934. Other peripheral output devices, not shown, such as speakers and printers, may be connected to the hardware device 900.

The hardware device 900 may operate in a networked environment using logical connections to one or more remote nodes (not shown) via communication interface 912. The remote node may be another computer, a server, a router, a peer device or other common network node, and typically includes many or all of the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 912 may include logic configured to support direct memory access (DMA) transfers between memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

It should be understood that the arrangement of hardware device 900 illustrated in FIG. 9 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 900.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
    one or more processors; and
    a non-transitory computer readable medium storing a plurality of instructions, which when executed, cause the one or more processors to:
    generate a data structure based on unique identifiers of objects in object storages, positions in the data structure corresponding to hashes of the unique identifiers;
    set indicators in positions in the data structure;
    determine whether a first number of regions of active data objects in a first data storage and a second number of regions of active data objects in a second data storage each fail to satisfy a data threshold;
    create a model, in response to a determination that the first number of regions and the second number of regions each fail to satisfy the data threshold, the model including information identifying locations and sizes of the first regions of the active data objects and the second regions of the active data objects such that a sum of the sizes satisfies a model size range;

reset the indicators in positions in the data structure that correspond to hashes of unique identifiers of active data objects associated with the model; and enable a remote storage to copy the first regions of the active data objects and the second regions of the active data objects to a third data storage, and to delete the first data storage and the second data storage.

2. The system of claim 1, wherein generating the data structure comprises storing an index of unique identifiers of the objects in the object storages, and setting the indicators in the positions in the data structure comprises identifying the unique identifiers of the active objects by reviewing metadata associated with the objects in the object storages, and generating hashes of the unique identifiers of the active objects.

3. The system of claim 1, wherein the plurality of instructions further causes the processor to:

determine whether a number of regions of active metadata objects in a first metadata storage satisfies a metadata threshold;

copy regions of active metadata objects from the first metadata storage to a second metadata storage, in response to a determination that the number of the regions of the active metadata objects in the first metadata storage does not satisfy the metadata threshold;

reset the indicators in positions in the data structure that correspond to hashes of unique identifiers of active metadata objects copied to the second metadata storage; and reset the indicators in positions in the data structure that correspond to hashes of unique identifiers of the active metadata objects stored in the first metadata storage, in response to a determination that the number of the regions of the active metadata objects in the first metadata storage satisfies the metadata threshold.

4. The system of claim 3, wherein determining whether the first number of regions and the second number of regions each fail to satisfy the data threshold comprises identifying the first regions and the second regions by generating hashes of unique identifiers of the data objects in the first data storage and the data objects in the second data storage and identifying which of the hashes of the unique identifiers of the data objects in the first data storage and the second data storage correspond to the indicators set in the positions of the data structure.

5. The system of claim 4, wherein determining whether the number of the regions of the active metadata objects in the first metadata storage satisfies the metadata threshold comprises identifying the regions of the active metadata objects by generating hashes of unique identifiers of the metadata objects and identifying which of the hashes of the unique identifiers of the metadata objects correspond to the indicators set in the positions of the data structure.

6. The system of claim 5, wherein copying the regions of the active metadata objects from the first metadata storage to the second metadata storage comprises creating the second metadata storage and deleting the first metadata storage.

7. The system of claim 1, wherein the plurality of instructions further causes the processor to reset the indicators in positions in the data structure in response to a determination that the number of the regions of the active data objects in the first data storage and the number of the regions of the active data objects in the second data storage do not each fail to satisfy the data threshold, the positions corresponding to hashes of unique identifiers of the active data objects stored in at least one of the first data storage and the second data storage.

8. The system of claim 1, wherein the data structure is implemented as a perfect hash vector.

9. A method comprising:

generating a data structure based on unique identifiers of objects in object storages, positions in the data structure corresponding to hashes of the unique identifiers;

setting indicators in positions in the data structure;

determining whether a first number of regions of active data objects in a first data storage and a second number of regions of active data objects in a second data storage each fail to satisfy a data threshold;

creating a model, in response to a determination that the first number of regions and the second number of regions each fail to satisfy the data threshold, the model including information identifying locations and sizes of the first regions of the active data objects and the second regions of the active data objects such that a sum of the sizes satisfies a model size range;

resetting the indicators in positions in the data structure that correspond to hashes of unique identifiers of active data objects associated with the model; and enabling a remote storage to copy the regions of the active data objects in the first data storage and the regions of the active data objects in the second data storage to a third data storage, and to delete the first data storage and the second data storage.

10. The method of claim 9, wherein generating the data structure comprises storing an index of unique identifiers of the objects in the object storages, and setting the indicators in the positions in the data structure comprises identifying the unique identifiers of the active objects by reviewing metadata associated with the objects in the object storages, and generating hashes of the unique identifiers of the active objects.

11. The method of claim 9, wherein the method further comprises:

determining whether a number of regions of active metadata objects in a first metadata storage satisfies a metadata threshold;

copying regions of active metadata objects from the first metadata storage to a second metadata storage, in response to a determination that the number of the regions of the active metadata objects in the first metadata storage does not satisfy the metadata threshold;

resetting the indicators in positions in the data structure which correspond to hashes of unique identifiers of active metadata objects copied to the second metadata storage; and resetting the indicators in positions in the data structure that correspond to hashes of unique identifiers of the active metadata objects stored in the first metadata storage, in response to a determination that the number of the regions of the active metadata objects in the first metadata storage satisfies the metadata threshold.

12. The method of claim 11, wherein determining whether the first number of regions and the second number of regions each fail to satisfy the data threshold comprises identifying the first regions and the second regions by generating hashes of unique identifiers of the data objects in the first data storage and the data objects in the second data storage and identifying which of the hashes of the unique identifiers of the data objects in the first data storage and the second data storage correspond to the indicators set in the positions of the data structure.

13. The method of claim 12, wherein determining whether the number of the regions of the active metadata objects in the first metadata storage satisfies the metadata threshold comprises identifying the regions of the active metadata objects by generating hashes of unique identifiers of the metadata objects and identifying which of the hashes of the unique identifiers of the metadata objects correspond to the indicators set in the positions of the data structure.

14. The method of claim 11, wherein copying the regions of the active metadata objects from the first metadata storage to the second metadata storage comprises creating the second metadata storage and deleting the first metadata storage.

15. The method of claim 9, wherein the method further comprises resetting the indicators in positions in the data structure in response to a determination that the number of the regions of the active data objects in the first data storage and the number of the regions of the active data objects in the second data storage do not each fail to satisfy the data threshold, the positions corresponding to hashes of unique identifiers of the active data objects stored in at least one of the first data storage and the second data storage.

16. The method of claim 9, wherein the data structure is implemented as a perfect hash vector.

17. A computer program product, comprising a non-transitory computer-readable medium having a computer-readable program code embodied therein to be executed by one or more processors, the program code including instructions to:
generate a data structure based on unique identifiers of objects in object storages, positions in the data structure corresponding to hashes of the unique identifiers;
set indicators in positions in the data structure;
determine whether a first number of regions of active data objects in a first data storage and a second number of regions of active data objects in a second data storage each fail to satisfy a data threshold;
create a model, in response to a determination that the first number of regions and the second number of regions each fail to satisfy the data threshold, the model including information identifying locations and sizes of the first regions of the active data objects and the second regions of the active data objects such that a sum of the sizes satisfies a model size range;
reset the indicators in positions in the data structure that correspond to hashes of unique identifiers of active data objects associated with the model; and
enable a remote storage to copy the regions of the active data objects in the first data storage and the regions of the active data objects in the second data storage to a third data storage, and to delete the first data storage and the second data storage.

18. The computer program product of claim 17, wherein generating the data structure comprises storing an index of unique identifiers of the objects in the object storages, and setting the indicators in the positions in the data structure comprises identifying the unique identifiers of the active objects by reviewing metadata associated with the objects in the object storages, and generating hashes of the unique identifiers of the active objects.

19. The computer program product of claim 17, wherein the program code includes further instructions to:
determine whether a number of regions of active metadata objects in a first metadata storage satisfies a metadata threshold;
copy regions of active metadata objects from the first metadata storage to a second metadata storage, in response to a determination that the number of the regions of the active metadata objects in the first metadata storage does not satisfy the metadata threshold;
reset the indicators in positions in the data structure which correspond to hashes of unique identifiers of active metadata objects copied to the second metadata storage; and
reset the indicators in positions in the data structure that correspond to hashes of unique identifiers of the active metadata objects stored in the first metadata storage, in response to a determination that the number of the regions of the active metadata objects in the first metadata storage satisfies the metadata threshold.

20. The computer program product of claim 19, determining whether the first number of regions and the second number of regions each fail to satisfy the data threshold comprises identifying the first regions and the second regions by generating hashes of unique identifiers of the data objects in the first data storage and the data objects in the second data storage and identifying which of the hashes of the unique identifiers of the data objects in the first data storage and the second data storage correspond to the indicators set in the positions of the data structure.

21. The computer program product of claim 20, wherein determining whether the number of the regions of the active metadata objects in the first metadata storage satisfies the metadata threshold comprises identifying the regions of the active metadata objects by generating hashes of unique identifiers of the metadata objects and identifying which of the hashes of the unique identifiers of the metadata objects correspond to the indicators set in the positions of the data structure.

22. The computer program product of claim 19, wherein copying the regions of the active metadata objects from the first metadata storage to the second metadata storage comprises creating the second metadata storage and deleting the first metadata storage.

23. The computer program product of claim 17, wherein the program code includes further instructions to reset the indicators in positions in the data structure in response to a determination that the number of the regions of the active data objects in the first data storage and the number of the regions of the active data objects in the second data storage do not each fail to satisfy the data threshold, the positions corresponding to hashes of unique identifiers of the active data objects stored in at least one of the first data storage and the second data storage.

* * * * *